United States Patent Office

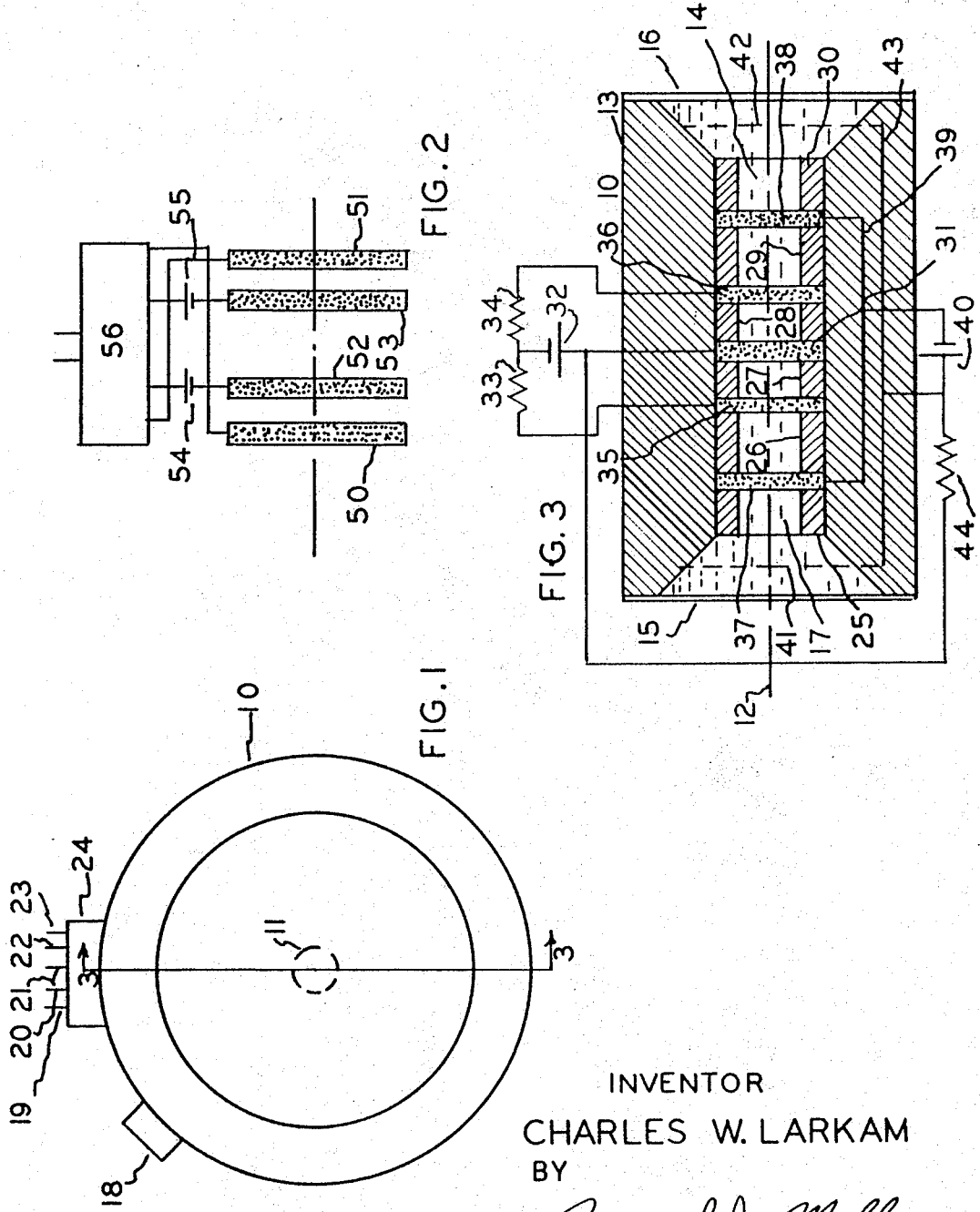

3,457,466
Patented July 22, 1969

3,457,466
FREQUENCY SOLION TRANSDUCER
Charles W. Larkam, Austin, Tex., assignor, by mesne assignments, to the United States of America as represented by the Secretary of the Navy
Filed May 11, 1967, Ser. No. 638,706
Int. Cl. H04r 21/00
U.S. Cl. 317—231          10 Claims

ABSTRACT OF THE DISCLOSURE

The solion transducer of the invention prevents feedback through the electrolytic medium and comprises a cylindrical housing with an aperture at its longitudinal axis through which a redox electrolyte flows. The anode is mounted in the aperture near the center. A cathode is spaced at each side of the anode, a guard electrode beyond each cathode, and outer electrodes are between the guard electrodes and the diaphragms forming the walls at the ends of the aperture. The electrodes are biased so the anode at the center is positive relative to the cathodes and the outer electrodes positive relative to the guard electrodes.

---

This invention relates to an improved solion transducer and more particularly to the type of device wherein an electrolytic solution is caused to flow and thereby producing a potential difference between electrodes.

More specifically this invention relates to a solion transducer wherein all of the elements are disposed along a longitudinal axis wherein the anode is centrally located and going out along the axis and normal thereto are signal cathodes, guard electrodes, outer electrodes and flexible diaphragms. The entire device is filled with a liquid of a redox type.

Solion transducers have an advantage over other types of transducers for sensing infrasonic pressure signals because they combine high sensitivity, single load circuit requirements, and a stable zero with ability to operate at near direct current. Previous solion transducers, however, have had a sensitivity and zero point which is orientation sensitive and have been sensitive to temperature transients. They had also reached a practical limit of about 0.5 cycle per second for the upper cutoff frequency leaving a series gap below the frequency region readily covered by conventional microphones. The objects of this invention are to improve upon existing solion transducers by eliminating the dependence of output upon orientation and thermal gradients and to raise the upper cutoff frequency.

The prior art relevant to this invention is given in my paper in The Journal of the Acoustical Society of America, 37, 664 (April 1965). The electrode arrangement in the previous generation of solion transducers is there reproduced. The arrangement involves a pair of cathodes spaced an arbitrary distance apart and separated by approximately 0.5 centimeter from the parallel anodes placed outside them. Multihole insulating cathode orifice plates approximately 0.002 centimeter thick are placed against the outside surfaces of the porous cathode discs. Diffusion and natural convection currents induced by density changes accompanying electrolysis or by temperature gradients tend to keep the electrolyte concentration approximately the same at the outer face of the cathode orifices plates as at the anode surface, despite the fact that the anode and cathode are source and sink, respectively, for $I_3^-$ ions which act as minority charge carriers. The effective electrode spacing for each half cell is approximately equal to the thickness of the corresponding cathode orifice plates. These two plates are made as nearly alike as possible. According to the theoretical analysis given in the paper cited above, the upper cutoff frequency is inversely proportional to the sqaure of the effective anode-to-cathode spacing. Since fidelity of response depends upon mutual cancellation of non-linear effects in the outputs of the individual cathodes, lack of symmetry in a solion transducer can result in distortion and direct current offset.

A weakness of the previous generation of transducers is the variability of the effective electrode spacing with changes in conditions affecting the mixing of electrolyte between the anode and outer face of the cathode orifice plate. These conditions include temperature gradients, orientation with respect to a gravitational field, and even acoustic input signal amplitude. The variability is aggravated as the cathode orifice plate thickness is reduced in an attempt to improve frequency response.

In view of the fact that the theory cited above regards the anode surface as a region of constant, "bulk," $I_3^-$ concentration, a reasonable step toward eliminating the variable effective anode spacing would be to make the actual anode-cathode separation equal to the effective electrode spacing desired. This step was taken and found completely unsatisfactory in otherwise conventional transducers. The sensitivity was found to increase strongly with increasing input signal period or amplitude, and distortion appears at moderate output amplitude. The trouble was postulated to be caused by a regenerative electrochemical feedback effect which raised the $I_3^-$ concentration at the upstream anode. This hypothesis was confirmed and the feedback eliminated by isolating the anodes electrically and operating an upstream anode with a downstream cathode. The disadvantage of such a transducer is that it requires a more elaborate electrical load circuit to combine the two half-cell outputs without having a direct current connection between them.

To eliminate the electrochemical feedback without complicating the electrical load circuit, the transducer was turned inside out, compared to previous standard practice, by having a single center anode with signal cathodes on either side of it. This innovation by itself is impractical because of the tendency of the signal cathodes eventually to collect all the $I_3^-$ from the outer chambers and concentrate it in the much smaller center anode cavity. To make the center-anode configuration practical, my invention employs the guard cathodes and outer anodes described below.

Therefore it is an object of this invention to provide an improved solion transducer.

It is yet a further object of this invention to provide a solion transducer having improved responses and sensitiveness.

It is yet a still another object of this invention to provide an improved solion transducer wherein all of the elements are located along a longitudinal axis and include an anode centrally disposed, a pair of signal cathodes, a pair of guard electrodes, a pair of outer electrodes and a pair of flexible diaphragms.

It is yet another object of this invention to provide an improved solion transducer, comprising a cathode housing having an aperture extending therethrough along its longitudinal axis; first and second flexible diaphragms closing the aperture; a first anode normal to the longitudinal axis and centrally disposed in the aperture; first and second signal cathodes normal to the axis and spaced on either side of the anode; first and second guard electrodes normal to the axis and spaced from the signal cathodes; first and second outer electrodes normal to the axis and positioned between the guard electrodes and the diaphragms; an electrolytic solution filling the entire aperture; electrical means for biasing the outer electrodes positive with respect to the guard electrodes; means, including a load resistance coupled to the cathodes and anode for biasing the anode positive with respect to the cathodes; and means, for electrically connecting the outer electrodes to the anode, the flexible diaphragms moving on receipt of pressure signals and causing an electrical signal to be produced across the load resistors.

A further object of this invention is to provide an electrode arrangement which permits a simpler electrical readout circuit by eliminating the need for anode isolation.

Yet another object of this invention is to provide for the suppression of electrolyte circulation by natural convection between a signal cathode and its opposing anode.

Other objects, advantages and novel features of the invention will become apparent from the following detailed description of the invention when considered in conjunction with the accompanying drawings wherein:

FIGURE 1 is a view of the outside of a transducer showing the centrally disposed cavity;

FIGURE 2 is a schematic view of a prior art device; and

FIGURE 3 is a view along lines 3—3 in FIGURE 1.

FIGURE 1 shows an exterior view, normal to the axis, of a transducer 10 and indicates the relative size and position of a cavity 11. A typical diameter for cavity 11 is 0.05 inch. FIGURE 3 shows schematically the electrode arrangement of the subject invention, in a plane including axis 12 of transducer 10. This drawing deliberately distorts the proportions of the prototype device in order to show the essential features more clearly, since the gaps between the three most closely spaced electrodes in the center are, in one successful embodiment, only 0.0002 inch apart, while the diameters of the electrode discs and the plastic body were 0.187 inch and 3.0 inches respectively. A scale drawing of reasonable size would obviously show the electrodes so jammed together as to obscure the arrangement.

Referring to FIGURES 1 and 3 a solion body 13 of molded polytrichlorofluoroethylene plastic is generally cylindrical in shape, and has a centrally disposed aperture 14 disposed about axis 12. First and second flexible diaphragms 15, 16, close aperture 14, all void in which is filled with electrolyte 17. The electrolyte is an aqueous solution of iodine and potassium iodide. The KI normality is made at least 50 times that of the $I_2$ added. The latter is present predominately as $I_3^-$. A typical KI concentration is 4.0 N. The electrolyte is introduced through filling ports 18, subsequently plugged and sealed. Electrode leads 19, 20, 21, 22, 23 emerge through a terminal boss 24 which helps to anchor and seal them in body 13. A series of electrically cylindrical insulating spacing and retaining members 25, 26, 27, 28, 29, and 30 mounted along the transducer axis to hold the electrodes in proper relation to one another.

A center porous electrode 31 is biased as an anode by an external battery 32, the negative side of which connects through load resistors 33, 34 to first and second porous signal cathodes 35 and 36. Outside signal cathodes 35, 36 are first and second porous guard electrodes 37, 38 that are connected together internally by lead 39 and are biased by external battery 40 as cathodes relative to first and second outer electrodes or anodes 41, 42 that are connected together internally by lead 43. Reasonable bias supply voltages, represented by batteries 32 and 40 are 0.6 volt. Electrical resistor 44 is connected externally between center anode 31 and the outer electrodes 41 and 42.

Before meaningful current readings can be made, the device must have been on bias and under drive conditions that are not excessive for a long enough time to permit establishment of steady electrolyte concentration distribution outside of the two signal cathodes 35, 36. This "settling-down" period allow the $I_3^-$ concentration in the regions between the signal cathodes and guard cathodes to be reduced to a negligible level, as a result of the electrons entering at the cathodes. The reaction at the cathodes is:

$$I_3^- + 2e \rightleftarrows 3I^-$$

This reaction proceeds in the reverse direction at the anodes, where $I_3^-$ is regenerated at the same rate at which it is reduced at the cathodes.

When equilibrium has been established with the electrical bias supplies connected and zero pressure acting across the diaphragms, $I_3^-$ diffuses outward in both directions from center anode 31. It reacts at the two signal cathodes, 35 and 36, allowing equal electrical currents to flow through the pair of load resistors 33, 34. The net voltage across this pair of identical resistors is then zero. Guard electrodes 37, 38 pick up $I_3^-$ diffusing in from the side cavities, and in effect redeposit it at the outer electrodes 41, 42. The guard electrodes thus prevent $I_3^-$ from reaching the signal cathodes from the outside. Equalization of electrical potential at the center and outer anodes through resistor 44 serves to maintain the average $I_3^-$ concentration in the center aperture at the bulk value. A reasonable value for resistor 44 is 100 ohms but should be selected by experiment to give the best results with a given electrode size and spacing, electrolyte composition, bias, and signal conditions. Its purpose is to restrict transfer of $I_3^-$ into or out of the center anode region as a result of transient signal conditions which could otherwise change sensitivity during a pressure cycle, with resultant distortion.

In operation, a differential dynamic pressure signal acting across the diaphragms causes electrolyte flow. The transfer of $I_3^-$ to the downstream signal cathode is correspondingly increased and that to the upstream signal cathode is decreased. According to the quantitative theoretical formulation developed in the paper cited above, the difference between the electrical currents flowing in the two load resistors will be directly proportional to electrolyte flow provided that the construction is symmetrical, that the $I_3^-$ concentration at the signal anode remains constant, and that the signal cathodes pick up all the $I_3^-$ reaching them by diffusion and convection.

FIGURE 2 shows a prior art device including a pair of anodes 50, 51; a pair of cathodes 52, 53; a pair of batteries 54, 55 that supply bias potential; and an output circuit 56. It is to be understood that only the general arrangement of device is here shown, the housing, diaphragms, etc., having been left out for clarity. When electrolyte flows from left to right in the arrangement of FIGURE 2, the external circuit 56 supplies electrons to the left compartment and removes them from the right. Accordingly an electrical potential builds up, making the left side negative and the right side positive, until the migration of $I^-$ from left to right occcurs at a high enough rate to achieve a steady state. If the anodes 50, 51 are shorted together, a flow of electrons will occur from the left anode 50 to the right one 51; the net effect is that $I_3^-$ tends to be "filtered" from the solution passing between the cathodes 52, 53 and to pile up at the upstream anode. As a consequence, sensitivity increases with period, and wave form is distorted. Such an $I_3^-$ concentration buildup at the "upstream" anode cannot occur in the electrode arrangement of FIGURE 3 embodying the present invention. There is only one signal anode 31, and both signal cathodes feed back to it all of the $I_3^-$ they pick up. But this supply is just adequate to maintain constant $I_3^-$ concentration in the anode cavity since the guard cathodes make the $I_3^-$ in the bulk unavailable to the signal electrode region. At the same time, any gradual change in absolute quantity of $I_3^-$ present within the cell as a whole (possibility, as a result, of $O_2$ diffusing through a diaphragm and oxidizing $I^-$) is spread throughout the cell instead of making a significant change in the concentration of the minute volume of electrolyte around the signal anode.

It is important, for achieving good frequency response, not only to keep the signal anode-cathode spacing small but also to keep the signal anode thin. Even though the center anode arrangement makes it impossible for $I_3^-$ regeneration to occur at the wrong (signal) anode, it is possible to develop an $I_3^-$ gradient across a thick porous anode. The reason for this gradient is that $I_3^-$ generation occurs preferentially on the side where the $I^-$ concentration is highest from its generation at a cathode. Any necessity for $I_3^-$ to shift from one side of the anode to the other as the flow changes direction in effect increases the "diffusion capacity" and degrades frequency response.

Keeping the $I^-$ concentration high while limiting the $I_3^-$ concentration in the bulk electrolyte will minimize the tendency for $I_3^-$ to be generated preferentially nearest Obviously many modifications and variations of the present invention are possible in the light of the above teachings. It is therefore to be understood that within the scope of the appended claims the invention may be practiced otherwise than as specifically described.

I claim:
1. An improved solion transducer, comprising:
   (a) a cylindrical housing having an aperture extending therethrough along its longitudinal axis;
   (b) first and second flexible diaphragms closing said aperture;
   (c) an anode normal to said longitudinal axis and centrally disposed in said aperture;
   (d) first and second signal cathodes normal to said axis and spaced on either side of said anode;
   (e) first and second guard electrodes normal to the said axis and spaced from said signal cathodes;
   (f) first and second outer electrodes normal to said axis and positioned between said guard electrodes and said diaphragms;
   (g) an electrolytic solution filling said entire aperture;
   (h) electrical means for biasing said outer electrodes positive with respect to said guard electrodes;
   (i) means, including load resistance coupled to said cathodes and said anode for biasing said anode positive with respect to said cathodes; and
   (j) means for electrically connecting said outer electrodes to said anode, said flexible diaphragms moving on receipt of pressure signals causing electrical signal to be produced across said load resistors.

2. The transducer of claim 1 wherein said anode, said signal cathodes and said guard electrodees are disc shaped porous members.

3. The transducer of claim 2 wherein the spacing between said anode, said cathodes and said electrodes is less than .001 inch.

4. The transducer of claim 3 wherein the diameter of said aperture is at least 20 times as great as the spacing between said anode, said cathodes, and said guard electrodes.

5. The transducer of claim 1 wherein said load resistor is center tapped to provide a balanced load between said anode and said first cathode and said anode and said second cathode.

6. The transducer of claim 5 wherein a plurality of annular spacer members are provided to maintain said anode, said cathode and said guard electrodes in plane parallel spaced relationship normal to said axis in said aperture.

7. An improved solion transducer, comprising:
   (a) means, including a cylindrical housing having an aperture extending therethrough along the longitudinal axis of said housing, said aperture having first and second end portions of generally conical shape with the smaller diameters facing the mid-point of said housing;
   (b) an anode positioned midway in said aperture between said end portions;
   (c) a first cathode positioned between said anode and said first end portion;
   (d) a first guard electrode positioned between said first cathode and said first end portion;
   (e) a first outer electrode positioned in said first end portion;
   (f) a second cathode positioned between said anode and said second end portion;
   (g) a second guard electrode positioned between said second cathode and said second end portion;
   (h) a second outer electrode positioned in said second end portion;
   (i) first and second flexible members closing said first and second ends of said aperture;
   (j) an electrolytic solution filling said entire aperture; and
   (k) electrical means coupled to said anode, first and second cathodes, first and second guard electrodes and said first and second outer electrodes for biasing said anode positive with respect to said cathodes and for biasing said outer electrodes positive with respect to said guard electrodes, for connecting said anode to said guard electrodes and for providing an output circuit including a pair of equal resistors coupled to said anode, said flexible members moving upon receipt of a pressure signal causing said electrolytic solution to flow back and forth between said anode and said cathodes to produce a signal across output circuit.

8. The transducer of claim 7 wherein there are provided a plurality of annular space members in said aperture for maintaining the plane parallel position of said anode, said cathodes and said guard electrodes.

9. The transducer of claim 8 wherein said anode, said cathodes, and said guard electrodes are porous disc shaped members, and said outer electrodes are wire mesh members.

10. The transducer of claim 9 wherein said disc members are individually spaced along axis less than .001 inch apart.

References Cited

UNITED STATES PATENTS

| | | | |
|---|---|---|---|
| 2,896,095 | 7/1959 | Reed et al. | 317—231 X |
| 3,157,832 | 11/1964 | Hurd | 317—231 |
| 3,211,968 | 10/1965 | Grams et al. | 317—231 |
| 3,359,465 | 12/1967 | Larkam | 317—231 |

JAMES D. KALLAM, Primary Examiner

U.S. Cl. X.R.

340—14